United States Patent
Pedersen et al.

(10) Patent No.: US 9,507,406 B2
(45) Date of Patent: Nov. 29, 2016

(54) CONFIGURING POWER DOMAINS OF A MICROCONTROLLER SYSTEM

(71) Applicant: Atmel Corporation, San Jose, CA (US)

(72) Inventors: Frode Milch Pedersen, Trondheim (NO); Ronan Barzic, Tiller (NO); Patrice Menard, Saint-Mars-du-Desert (FR); Mickael Le Dily, Carquefou (FR); Thierry Gourbilleau, Le Loroux-Bottereau (FR); Morten Werner Lund, Flatåsen (NO)

(73) Assignee: Atmel Corporation, San Jose, CA (US)

( * ) Notice: Subject to any disclaimer, the term of this patent is extended or adjusted under 35 U.S.C. 154(b) by 200 days.

(21) Appl. No.: 13/786,042

(22) Filed: Mar. 5, 2013

(65) Prior Publication Data

US 2014/0089714 A1    Mar. 27, 2014

Related U.S. Application Data

(60) Provisional application No. 61/704,051, filed on Sep. 21, 2012.

(51) Int. Cl.
   *G06F 1/32* (2006.01)

(52) U.S. Cl.
   CPC ............ *G06F 1/3243* (2013.01); *G06F 1/3287* (2013.01); *Y02B 60/1239* (2013.01); *Y02B 60/1282* (2013.01); *Y02B 60/32* (2013.01)

(58) Field of Classification Search
   CPC ............... G06F 1/3243; G06F 1/3287; Y02B 60/1239; Y02B 60/1282; Y02B 60/32
   See application file for complete search history.

(56) References Cited

U.S. PATENT DOCUMENTS

| | | |
|---|---|---|
| 4,475,134 A | 10/1984 | Bowden et al. |
| 4,677,566 A | 6/1987 | Whittaker et al. |
| 4,703,486 A | 10/1987 | Bemis |
| 5,579,498 A | 11/1996 | Ooi |
| 5,623,234 A | 4/1997 | Shaik et al. |
| 6,163,851 A | 12/2000 | Yamazoe et al. |
| 6,175,891 B1 | 1/2001 | Norman et al. |
| 6,255,878 B1 | 7/2001 | Gauvin et al. |
| 6,320,717 B1 | 11/2001 | Feng |
| 6,393,080 B1 | 5/2002 | Kamoshida et al. |
| 6,462,830 B1 | 10/2002 | Negishi |
| RE38,108 E | 5/2003 | Chee |
| 6,754,836 B2 | 6/2004 | Shimizu et al. |
| 6,848,055 B1 | 1/2005 | Yarch |
| 7,203,855 B2 | 4/2007 | Chou |
| 7,391,250 B1 | 6/2008 | Chuang |
| 7,444,530 B2 | 10/2008 | Deppe |
| 7,514,958 B1 | 4/2009 | Zhou |
| 7,574,683 B2 * | 8/2009 | Wilson ................ G06F 17/5045  716/100 |
| 7,770,142 B1 | 8/2010 | Shmayovitsh |

(Continued)

OTHER PUBLICATIONS

US Non-Final Office Action in U.S. Appl. No. 13/785,999, dated Mar. 25, 2015, 12 pages.

(Continued)

*Primary Examiner* — Thomas Lee
*Assistant Examiner* — Chad Erdman
(74) *Attorney, Agent, or Firm* — Fish & Richardson P.C.

(57) ABSTRACT

A microcontroller system is organized into power domains. A power manager of the microcontroller system can change the power configuration of a power domain in response to event from an event generating module without activating a processor of the microcontroller system.

20 Claims, 3 Drawing Sheets

(56) References Cited

U.S. PATENT DOCUMENTS

| | | |
|---|---|---|
| 7,895,458 B2 | 2/2011 | Kim |
| 7,954,078 B1 | 5/2011 | Wang |
| 7,984,317 B2 | 7/2011 | Conroy |
| 8,001,433 B1 | 8/2011 | Bhatia |
| 8,190,931 B2 | 5/2012 | Laurenti et al. |
| 8,255,722 B2 | 8/2012 | Pedersen et al. |
| 8,352,235 B1 | 1/2013 | Lin |
| 8,683,419 B1 | 3/2014 | Hines |
| 8,791,743 B1 | 7/2014 | Tang |
| 2003/0006807 A1 | 1/2003 | Masuda et al. |
| 2003/0177404 A1 | 9/2003 | Jorgenson et al. |
| 2003/0183024 A1 | 10/2003 | Lohberg et al. |
| 2003/0198108 A1 | 10/2003 | Hausmann et al. |
| 2004/0148548 A1* | 7/2004 | Moyer ............... G06F 11/3664 714/25 |
| 2004/0158773 A1 | 8/2004 | Kang |
| 2005/0083081 A1 | 4/2005 | Jacobson et al. |
| 2007/0260794 A1 | 11/2007 | Ashish et al. |
| 2008/0072094 A1 | 3/2008 | Hayano et al. |
| 2008/0189455 A1 | 8/2008 | Dreps et al. |
| 2008/0211559 A1 | 9/2008 | Tanaka |
| 2009/0089607 A1 | 4/2009 | Rodriguez |
| 2009/0089725 A1 | 4/2009 | Khan |
| 2009/0135751 A1* | 5/2009 | Hodges ............... G06F 1/3209 370/311 |
| 2009/0140876 A1* | 6/2009 | Shi ..................... H04W 52/028 340/4.35 |
| 2009/0144571 A1* | 6/2009 | Tatsumi ................ G06F 1/26 713/320 |
| 2009/0153210 A1 | 6/2009 | Wang et al. |
| 2009/0204835 A1 | 8/2009 | Smith et al. |
| 2009/0256607 A1 | 10/2009 | Smith et al. |
| 2009/0259863 A1 | 10/2009 | Williams et al. |
| 2009/0259982 A1* | 10/2009 | Verbeure .............. G06F 17/505 716/129 |
| 2010/0064160 A1 | 3/2010 | Wilson |
| 2010/0156458 A1 | 6/2010 | Speers |
| 2010/0192115 A1 | 7/2010 | Yang |
| 2010/0306570 A1 | 12/2010 | Uchida et al. |
| 2011/0022826 A1* | 1/2011 | More .................... G06F 1/26 713/1 |
| 2011/0060931 A1* | 3/2011 | Radhakrishnan ..... G06F 1/3203 713/340 |
| 2011/0131427 A1 | 6/2011 | Jorgenson et al. |
| 2011/0138200 A1 | 6/2011 | Tomizawa |
| 2011/0208888 A1 | 8/2011 | Park |
| 2011/0221483 A1 | 9/2011 | Liu et al. |
| 2011/0252251 A1* | 10/2011 | de Cesare ............ G06F 1/3203 713/320 |
| 2011/0264902 A1* | 10/2011 | Hollingworth ....... G06F 1/3203 713/2 |
| 2011/0276812 A1* | 11/2011 | Lee ....................... G06F 1/26 713/300 |
| 2012/0017099 A1 | 1/2012 | David |
| 2012/0047402 A1 | 2/2012 | Chen et al. |
| 2012/0120958 A1 | 5/2012 | Mahadevan et al. |
| 2012/0161942 A1* | 6/2012 | Muellner ............ G07C 9/00309 340/10.5 |
| 2012/0268995 A1 | 10/2012 | Sugimoto et al. |
| 2013/0063114 A1 | 3/2013 | Agrawal et al. |
| 2013/0067250 A1 | 3/2013 | Wu et al. |
| 2013/0073878 A1 | 3/2013 | Jayasimha et al. |
| 2013/0097445 A1 | 4/2013 | Palaniappan et al. |
| 2013/0124895 A1 | 5/2013 | Saha et al. |
| 2013/0159776 A1* | 6/2013 | Gilday ................ G06F 11/3636 714/37 |
| 2013/0170413 A1* | 7/2013 | Chow .................. H04W 52/028 370/311 |
| 2013/0339589 A1 | 12/2013 | Qawami et al. |
| 2014/0089706 A1 | 3/2014 | Menard et al. |
| 2014/0089707 A1 | 3/2014 | Jouin et al. |
| 2014/0089708 A1 | 3/2014 | Menard et al. |
| 2014/0122833 A1 | 5/2014 | Davis |
| 2014/0281648 A1 | 9/2014 | Russell et al. |
| 2014/0301152 A1 | 10/2014 | Cox et al. |
| 2014/0359044 A1 | 12/2014 | Davis |
| 2015/0082092 A1 | 3/2015 | Sarangi |
| 2015/0082093 A1 | 3/2015 | Sarangi |
| 2015/0095681 A1 | 4/2015 | Jouin et al. |
| 2015/0220678 A1 | 8/2015 | Srivastava |
| 2015/0378423 A1 | 12/2015 | Hanssen |

OTHER PUBLICATIONS

US Non-Final Office Action in U.S. Appl. No. 13/789,902, dated May 15, 2015, 15 pages.

US Non-Final Office Action in U.S. Appl. No. 12/400,690, dated Sep. 12, 2011, 7 pages.

US Final Office Action in U.S. Appl. No. 12/400,690, dated Jan. 11, 2012, 7 pages.

US Notice of Allowance in U.S. Appl. No. 12/400,690, dated May 9, 2012, 6 pages.

Non-Final Office Action dated Apr. 9, 2015; U.S. Appl. No. 13/788,366, filed Mar. 7, 2013, 15 pages.

US Notice of Allowance in U.S. Appl. No. 13/788,366, dated Oct. 13, 2015, 20 pages.

US Notice of Allowance in U.S. Appl. No. 13/785,999, dated Sep. 10, 2015, 16 pages.

US Non-Final Office Action in U.S. Appl. No. 14/043,445, dated Aug. 25, 2015, 12 pages.

US Final Office Action in U.S. Appl. No. 13/789,902, dated Sep. 2, 2015, 18 pages.

* cited by examiner

CONFIGURING POWER DOMAINS OF A MICROCONTROLLER SYSTEM

CROSS-REFERENCE TO RELATED APPLICATIONS

This application claims the benefit and priority of U.S. Provisional Application Ser. No. 61/704,051, filed Sep. 21, 2012, the entire contents of which is hereby incorporated by reference.

TECHNICAL FIELD

This disclosure relates generally to electronics and more particularly to microcontroller systems.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes. Clocked peripheral modules in the microcontroller system are typically unavailable in ultra-low power, unclocked sleep modes, forcing applications to rely on higher-power clocked modes.

Conventional power reduction solutions for saving power in a microcontroller require that the clock to the Central Processing Unit (CPU) or peripheral modules be switched off, typically by implementing one or more sleep modes in the microcontroller. This solution can be extended until all clocks and analog modules have been switched off, and only leakage current remains, which is typically several orders of magnitude less than active current. The disadvantage of this conventional approach is that the functionality of the device is reduced, since some peripherals are designed to operate with a clock running

SUMMARY

A microcontroller system is organized into power domains. A power manager of the microcontroller system can change the power configuration of a power domain in response to event from an event generating module without activating a processor of the microcontroller system.

Particular implementations of the microcontroller system can provide one or more of the following advantages: 1) a microcontroller system can dynamically and flexibly change the power configuration of the microcontroller system power domains to a relevant power configuration, matching application requirements; 2) the microcontroller system can change a power configuration without intervention from a central processing unit, reducing power consumption and latency; and 3) the power manager can be configured by a user system to allow dynamic sequencing of changing the power configurations of different power domains.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
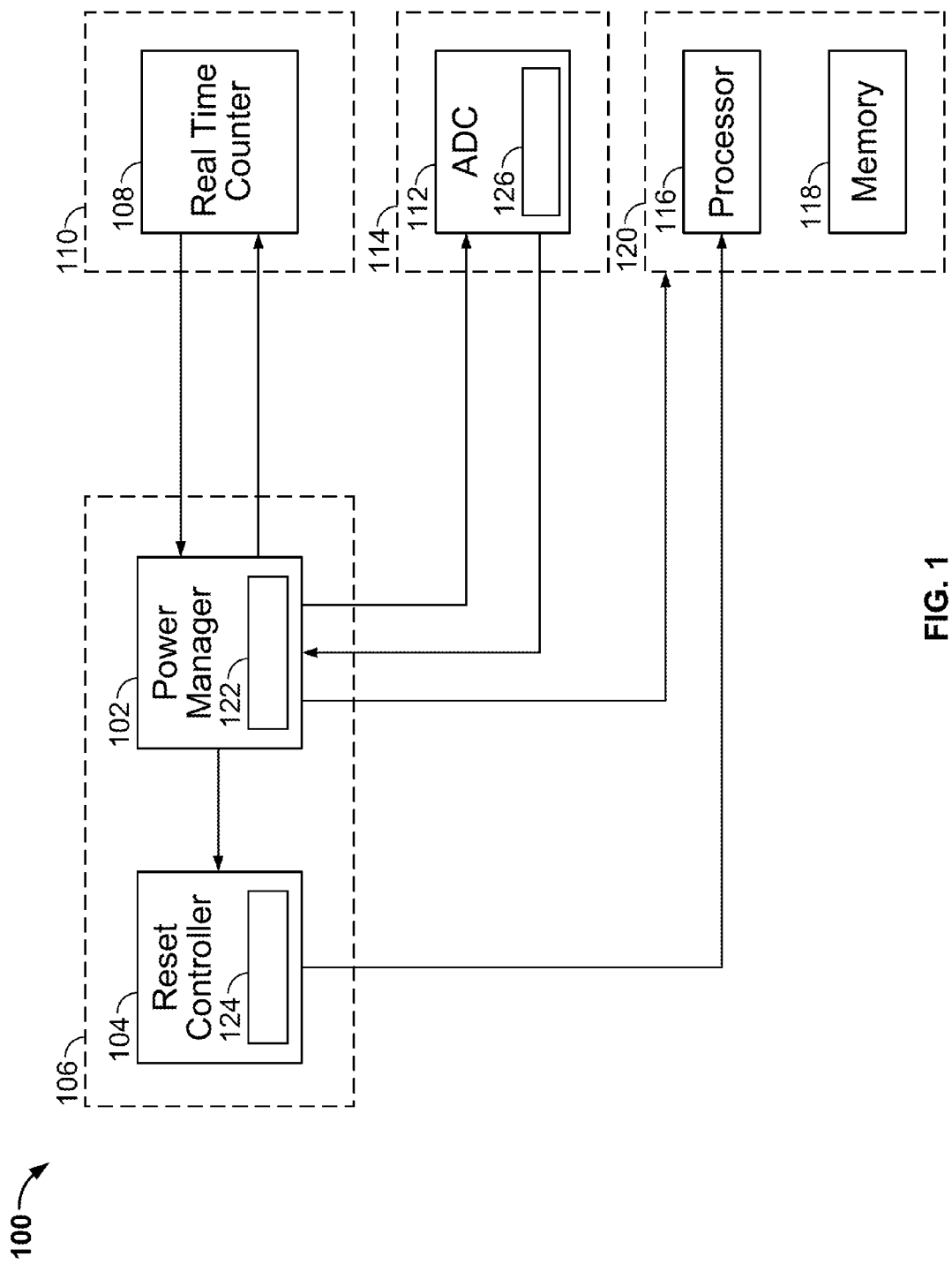
FIG. 1 is a schematic diagram of an example microcontroller system organized into power domains.

FIG. 1 is a schematic diagram of an example microcontroller system 100 organized into power domains 106, 110, 114, and 120. The microcontroller system includes a power manager 102 coupled to a reset controller 104 in first power domain 106; a real time counter (RTC) 108, coupled to the power manager, in a second power domain 110; an analog to digital converter (ADC) 112, coupled to the power manager, in a third power domain 114, and a processor (e.g., a central processing unit) and memory 118 in a fourth power domain 120. The processor is coupled to the reset controller.

A power domain can be, for example, one or more modules drawing power from a same power supply, e.g., at a same voltage. The microcontroller maintains a power configuration for each power domain. A power configuration includes one or more parameters for a power domain specifying, e.g., a higher or lower voltage for the power domain, whether or not a clock is frozen for the power domain, whether certain modules are enabled or disabled or operating in a reduced state for a reduced voltage, and so on. Changing the power configuration of a power domain can adjust the power consumption of a power domain.

In operation, the power manager can change the power configuration of a power domain in response to an event from an event generating module, e.g., the ADC or the RTC. For example, the power manager can cause a power domain to exit a power saving mode so that one or more modules of the power main can execute operations. Then the module can generate a new event to the power manager, e.g., to revert the power domain to its previous power configuration or to change the power configuration of another domain.

The power manager can change the power configuration of a power domain without intervention from the processor. Hence, instead of changing the power configuration of the processor's power domain to support the processor for changing power configurations, the power manager can change power configurations based on events from event generating modules. This can reduce power consumption of the processor's power domain, and it can reduce latency in changing the power configuration of a requested power domain.

For purposes of illustration, consider the following example scenario. A user system of the microcontroller system configures the power manager, through a user interface 122, so that upon receiving an event from the RTC (e.g., every 1 ms), the power manager causes the third power domain 114 to exit a power saving mode so that the ADC can perform a conversion. Upon receiving an event from the ADC indicating that the conversion is complete, the power manager causes the fourth power domain 120 to exit a power saving mode. The user system also configures the RTC to generate an event, e.g., every 1 ms, and the user system configures the ADC, e.g., via a user interface 126, to generate an event at the end of the conversion.

Then, the user system causes, e.g., via the power manager, the third and fourth power domains to enter a power saving mode. Since the fourth power domain is in a power saving mode, the processor is frozen.

After 1 ms passes, the RTC generates an event to the power manager. The power manager causes the third power domain 114 to exit the power saving mode because the user system configured the power manager to do so in response to the event. The ADC then performs a conversion. At the end of the conversion, the ADC sends an event to the power manager. Then power manager then causes the fourth power domain to exit the power saving mode. The processor is then running The user system can analyze the cause of the reset, e.g., whether the reset was a cold reset, a hot reset, or an ADC reset. The user system can analyze the cause of the reset via a reset controller user interface 124. In this example, since the ADC caused the reset, the user system will determine that the ADC caused the reset, so the user system can access the ADC to process the converted ADC value. For example, the user system can access the ADC via an ADC user interface 126.

For purposes of illustration, consider an example scenario where the ADC is configured to generate a second event (an "end of N conversions" event) after a number, N, of conversions. The N converted values are stored inside a local memory in the ADC. The power manager can be configured to that it causes the third power domain 114 to enter a power saving mode when receiving an "end of conversion" event, unless the power manager also receives an "end of N conversions" event.

The power manager can be configured so that, upon receiving an "end of N conversions" event, the power manager causes the fourth power domain 120 to exit the power saving mode, thus activating the processor. After the ADC reset, the processor can then clear the N converted values stores in the local memory of the ADC. In this case, the power manager can reduce by about N the overall power consumption compared to activating the processor after each ADC conversion.

Example Power Configuration Scenario

Figure 2:
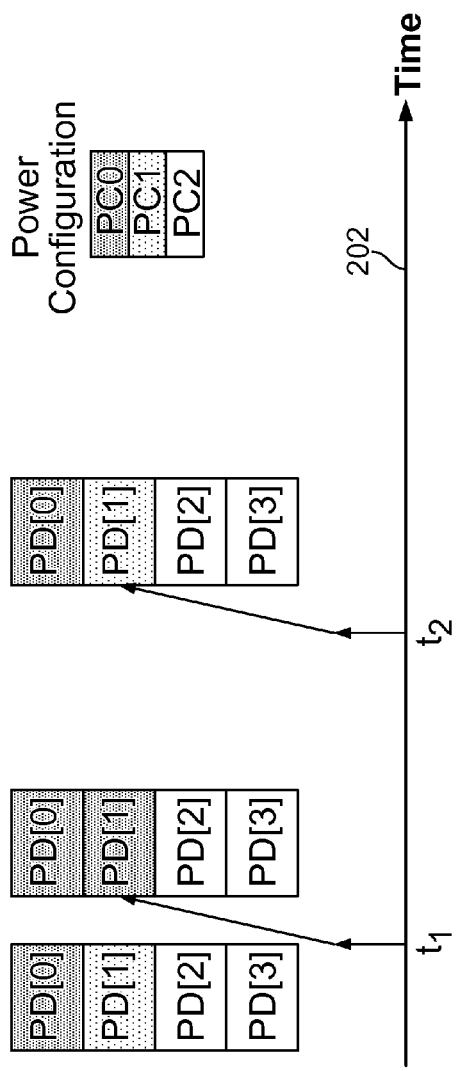
FIG. 2 is a schematic diagram illustrating an example scenario with a number of power domains and power configurations along a timeline.

FIG. 2 is a schematic diagram illustrating an example scenario with a number of power domains and power configurations along a timeline 202. The example scenario includes four power domains, PD[0]-PD[3]. Each of the four power domains can be configured into one of three power configurations, PC0-PC2.

Prior to time t1, PD[0] is configured to PC0, PD[1] is configured to PC1, and PD[2] and PD[3] are configured to PC2. At time t1, an event generating module sends an event to a power manager. The power manager is configured to change the power configuration of PD[1] to PC0 in response to the event, so after time t1, PD[1] is configured to PC0. For example, PD[1] may then be drawing a full system voltage and an active clock to perform some operations.

At time t2, the power manager receives another event. The power manager is configured to revert PD[1] to the PC1 power configuration, which can be a power saving mode. After time t2, PD[1] is configured to PC1. All of the changes of the power configurations can be accomplished without relying on a central processing unit and its associated power consumption.

Timing Diagram of Example Scenario

Figure 3:
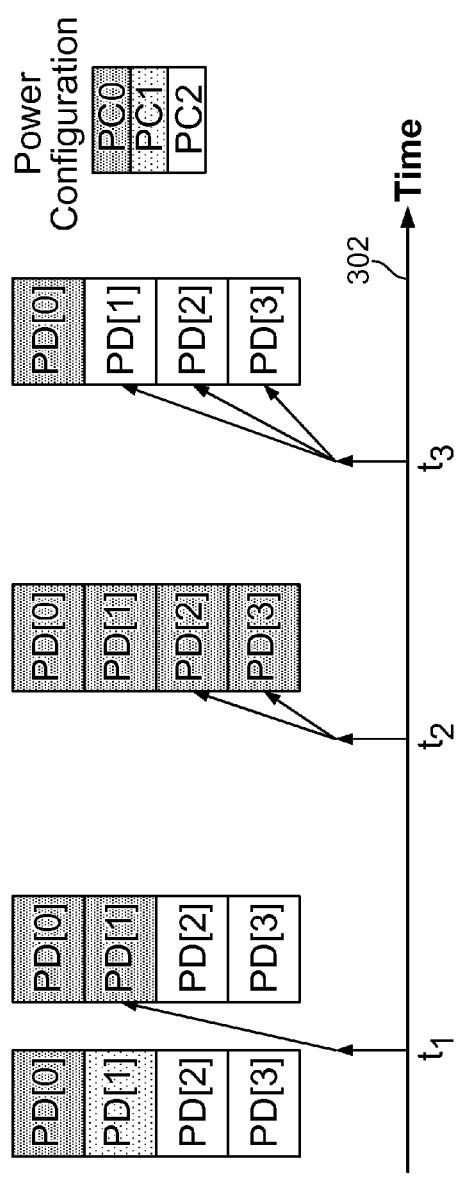
FIG. 3 is schematic diagram illustrating an example scenario with a number of power domains and power configurations along a timeline.

FIG. 3 is schematic diagram illustrating an example scenario with a number of power domains and power configurations along a timeline 302. The example scenario includes four power domains, PD[0]-PD[3]. Each of the four power domains can be configured into one of three power configurations, PC0-PC2.

Prior to time t1, PD[0] is configured to PC0, PD[1] is configured to PC1, and PD[2] and PD[3] are configured to PC2. At time t1, an event generating module sends an event to a power manager. The power manager is configured to change the power configuration of PD[1] to PC0 in response to the event, so after time t1, PD[1] is configured to PC0. For example, PD[1] may then be drawing a full system voltage and an active clock to perform some operations. At time t2, the power manager receives another event. The power manager is configured to change the power configurations of both PD[2] and PD[3] to PC0. At this point, all of the power domains PD[0]-PD[3] may be executing operations.

At time t3, the power manager receives another event, e.g., from a module in PD[0] or one of the other power domains. The power manage configures PD[1], PD[2], and PD[3] to PC2. PC2 can be, for example, a deep power saving mode. All of the changes of the power configurations can be accomplished without relying on a central processing unit and its associated power consumption.

Example Flowchart—Changing Power Configurations

Figure 4:
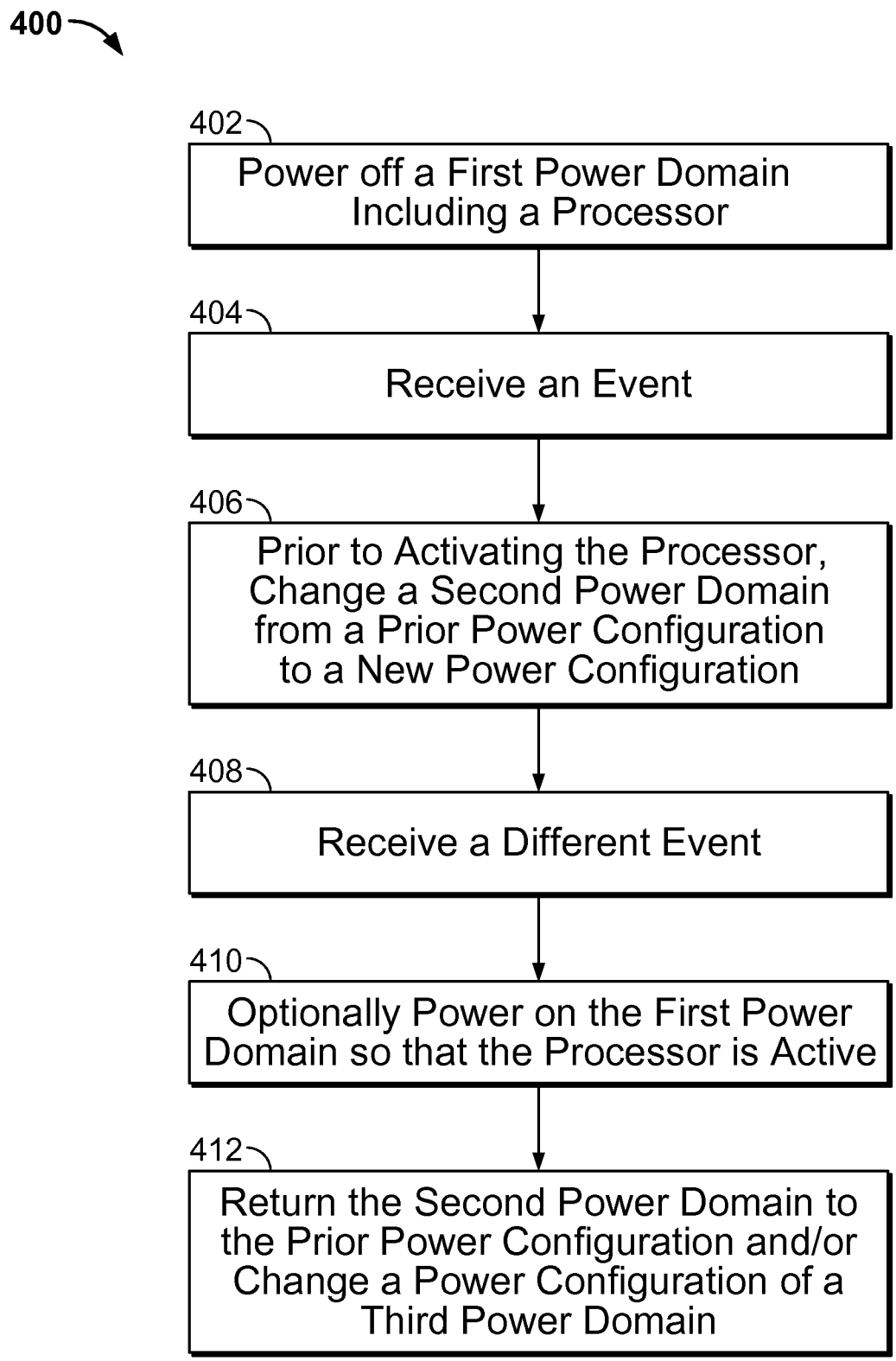
FIG. 4 is a flow diagram of an example process performed by a power manager of a microcontroller system.

FIG. 4 is a flow diagram of an example process 400 performed by a power manager of a microcontroller system. The microcontroller system can be the microcontroller system 100 of FIG. 1.

The power manager powers off a first power domain of the microcontroller system (402). The first power domain includes a processor, e.g., a central processing unit (CPU). As a consequence of powering off the first power domain, the processor is inactive.

The power manager receives an event from an event generating module (404). The event generating module can be, for example, an ADC or an RTC. In response to receiving the event and prior to activating the processor, the power manager changes a second power domain from a prior power configuration to a new power configuration (406). For example, the power manager can cause the second power domain to exit a power saving mode, without activating the processor.

The power manager receives a different event from a different module of the second power domain (408). For example, the event can be an event from an RTC, and the different event can be from an ADC indicating that a converted value is available. In response to the different event, the power manager can optionally power on the first power domain so that the processor is active (410) and is running from its default reset state. A user system can then investigate the different event via the processor by looking at the reset cause.

The power manager returns the second power domain to the prior power configuration, or changes a power configuration of a third power domain, or both (412). The power manager can be configured by a user system to revert the second power domain to the prior power configuration or to change the power configuration of a third power domain. These different cases are discussed above with reference to FIGS. 2 and 3.

While this document contains many specific implementation details, these should not be construed as limitations on the scope what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller system comprising:
   a processor;
   a power manager coupled to the processor; and
   an event generating module coupled to the power manager;
   wherein the microcontroller system is organized into a plurality of power domains, including a first power domain including the processor and a second power domain different from the first power domain, the event generating module being in a different power domain from the processor and the second power domain, the power manager being in a different power domain from the processor, the event generating module, and the second power domain; and
   wherein the power manager is configured to perform operations comprising:
      powering down the first power domain so that the processor is inactive;
      receiving an event from the event generating module, the event being associated with the event generating module and independent of a power state of the processor; and
      in response to receiving the event from the event generating module and prior to activating the processor, changing the second power domain from a prior power configuration to a new power configuration, independent of the power state of the processor.

2. The microcontroller system of claim 1, the operations further comprising:
   receiving a different event from a different module of the second power domain; and
   returning the second power domain to the prior power configuration.

3. The microcontroller system of claim 1, the operations further comprising:
   receiving a different event from a different module of the second power domain; and
   in response to receiving the different event, changing a third power domain from a different prior power configuration to a different new power configuration.

4. The microcontroller system of claim 3, the operations further comprising:
   in response to receiving the different event, powering up the first power domain so that the processor is active.

5. The microcontroller system of claim 1, wherein changing the second power domain from a prior power configuration to a new power configuration comprises activating at least one different module so that the different module can perform one or more actions.

6. The microcontroller system of claim 1, wherein the event generating module is a Real Time Counter (RTC) configured to periodically send the event to the power manager.

7. The microcontroller system of claim 6, further comprising an analog to digital converter (ADC) in the second power domain, and wherein changing the second power domain from a prior power configuration to a new power configuration comprises activating the second power domain so that the ADC can perform an analog to digital conversion.

8. The microcontroller system of claim 7, wherein the operations further comprise:
   receiving an end of conversion event from the ADC;
   in response to receiving the end of conversion event, powering up the first power domain so that the processor is active;
   receiving a signal from a user interface of the power manager to power down the first power domain and the second power domain; and
   in response to receiving the signal from the user interface, powering down the first power domain and the second power domain.

9. The microcontroller system of claim 1, wherein the power manager is in a third power domain and the event generating module is in a fourth power domain.

10. A method performed by a power manager of a microcontroller system, the microcontroller system comprising a processor coupled to the power manager and an event generating module coupled to the power manager, the method comprising:
    powering down a first power domain of the microcontroller system, the first power domain including the processor, so that the processor is inactive;
    receiving an event from the event generating module, the event generating module being in a different power domain from the processor, the event being associated with the event generating module and independent of a power state of the processor;
    in response to receiving the event from the event generating module and prior to activating the processor, changing a second power domain of the microcontroller system from a prior power configuration to a new power configuration, independent of the power state of the processor, the second power domain being different from the first power domain and the power domain including the event generating module, the power manager being in a different power domain from the processor, the event generating module, and the second power domain.

11. The method of claim 10, further comprising:
    receiving a different event from a different module of the second power domain; and
    returning the second power domain to the prior power configuration.

12. The method of claim 10, further comprising:
    receiving a different event from a different module of the second power domain; and
    in response to receiving the different event, changing a third power domain from a different prior power configuration to a different new power configuration.

13. The method of claim 12, further comprising:
    in response to receiving the different event, powering up the first power domain so that the processor is active.

14. The method of claim 10, wherein changing the second power domain from a prior power configuration to a new power configuration comprises activating at least one different module so that the different module can perform one or more actions.

15. The method of claim 10, wherein the event generating module is a Real Time Counter (RTC) configured to periodically send the event to the power manager.

16. The method of claim 15, wherein the microcontroller system further comprises an analog to digital converter (ADC) in the second power domain, and wherein changing the second power domain from a prior power configuration to a new power configuration comprises activating the second power domain so that the ADC can perform an analog to digital conversion.

17. The method of claim 16, further comprising:
receiving an end of conversion event from the ADC;
in response to receiving the end of conversion event, powering up the first power domain so that the processor is active;
receiving a signal from a user interface of the power manager to power down the first power domain and the second power domain; and
in response to receiving the signal from the user interface, powering down the first power domain and the second power domain.

18. The method of claim 10, wherein the power manager is in a third power domain and the event generating module is in a fourth power domain.

19. The microcontroller system of claim 7, the operations further comprising:
receiving an end of a specified number of conversion events from the ADC; and
in response to receiving the end of the specified number of conversion events, powering down the second power domain so that the ADC enters a power saving mode and powering up the first power domain so that the processor is active.

20. The method of claim 16, further comprising:
receiving an end of a specified number of conversion events from the ADC; and
in response to receiving the end of the specified number of conversion events, powering down the second power domain so that the ADC enters a power saving mode and powering up the first power domain so that the processor is active.

* * * * *